United States Patent [19]

Stephenson et al.

[11] 4,129,425

[45] Dec. 12, 1978

[54] GAS-ABSORPTION PROCESS

[75] Inventors: Michael J. Stephenson; Robert S. Eby, both of Oak Ridge, Tenn.

[73] Assignee: The United States of America as represented by the United States Department of Energy, Washington, D.C.

[21] Appl. No.: 816,575

[22] Filed: Jul. 18, 1977

[51] Int. Cl.$^2$ .............................................. B01D 53/16
[52] U.S. Cl. .......................................... 55/44; 55/48; 55/66
[58] Field of Search .................. 55/44, 66, 73, 89; 202/183, 184; 203/42

[56] References Cited

U.S. PATENT DOCUMENTS

| | | | |
|---|---|---|---|
| 1,853,330 | 4/1932 | Barstow et al. | 203/42 X |
| 2,661,812 | 12/1953 | Gilmore | 203/42 X |
| 2,764,532 | 9/1956 | Rauh | 203/42 X |
| 2,849,371 | 8/1958 | Gilmore | 55/89 X |
| 3,505,784 | 4/1970 | Hochgesand et al. | 55/44 |
| 3,762,133 | 10/1973 | Merriman et al. | 55/44 |
| 3,785,120 | 1/1974 | Merriman et al. | 55/44 |
| 3,887,339 | 6/1975 | Robertson | 55/66 |

OTHER PUBLICATIONS

McCabe et al., *Unit Operations of Chemical Eng.*, 2nd Edition, 1967, pp. 648–652, 672–674.
Shreve, *Chemical Process Industries,* 3rd Edition, 1967, pp. 107–116.
King, *Separation Processes,* 1971, pp. 334–339, 341–344, 347–350.

*Primary Examiner*—Robert H. Spitzer
*Attorney, Agent, or Firm*—Dean E. Carlson; Stephen D. Hamel; Fred O. Lewis

[57] ABSTRACT

This invention is an improved gas-absorption process for the recovery of a desired component from a feed-gas mixture containing the same. In the preferred form of the invention, the process operations are conducted in a closed-loop system including a gas-liquid contacting column having upper, intermediate, and lower contacting zones. A liquid absorbent for the desired component is circulated through the loop, being passed downwardly through the column, regenerated, withdrawn from a reboiler, and then recycled to the column.

A novel technique is employed to concentrate the desired component in a narrow section of the intermediate zone. This technique comprises maintaining the temperature of the liquid-phase input to the intermediate zone at a sufficiently lower value than that of the gas-phase input to the zone to effect condensation of a major part of the absorbent-vapor upflow to the section. This establishes a steep temperature gradient in the section. The stripping factors below this section are selected to ensure that virtually all of the gases in the downflowing absorbent from the section are desorbed. The stripping factors above the section are selected to ensure re-dissolution of the desired component but not the less-soluble diluent gases. As a result, a peak concentration of the desired component is established in the section, and gas rich in that component can be withdrawn therefrom.

The new process provides important advantages. The chief advantage is that the process operations can be conducted in a single column in which the contacting zones operate at essentially the same pressure.

10 Claims, 3 Drawing Figures

GAS-ABSORPTION PROCESS

BACKGROUND OF THE INVENTION

This invention was made in the course of, or under, a contract with the United States Energy Research and Development Administration. The invention relates generally to gas-absorption processes — i.e., processes in which a gas mixture is contacted with a liquid absorbent (solvent) for preferentially dissolving one or more components of the mixture. More particularly, the invention relates to continuous gas-absorption processes, in which a liquid absorbent is circulated continuously through a closed-loop system which includes gas-absorption, gas desorption, and absorbent-regeneration zones.

This invention is applicable, for example, to separations of the kind described or referenced in coassigned U.S. Pat. No. 3,762,133, issued on Oct. 2, 1973. Briefly, that patent discloses the use of liquid fluorocarbons as preferential absorbents (solvents) for selected components of various feed-gas mixtures, the selected components including xenon, krypton, oxygen, iodine, methyl iodide, and the lower oxides of carbon, nitrogen, and sulfur. The typical separation is conducted in a closed-loop system including a plurality of serially connected columns through which the liquid absorbent is circulated continuously. The system includes an absorption column, a fractionator column, and a stripper column, the last two columns being provided at their upper ends with condenser-containing systems for venting desorbed gases and at their lower ends with solvent reboilers. The liquid absorbent outflow from the absorber column usually is heated before introduction to the fractionator column. Typically, the three columns are operated at appreciably different superatmospheric pressures, and thus pressure-reducing valves are required in the liquid-flow lines between the columns. The pressure in the stripper column is much lower than that in the absorber column, so that a high-pressure-ratio pump is required to recycle the liquid solvent from the stripper to the absorber. The feed-gas mixture is introduced to the absorber, where the selected component preferentially dissolves in the liquid absorbent and is retained in the absorbent as it is passed through the fractionator and into the stripper. Depending on its solubility relative to other gases dissolved in the absorbent, the selected component either (a) desorbs in the stripper and is withdrawn therefrom as a gas or (b) remains in the liquid-absorbent outflow from the stripper and subsequently is recovered therefrom, as by distillation.

Gas absorption processes of the kind just described require the use of process systems which are not as compact, simple, or reliable as desired. This is due mainly to the use of a large number of system components and control systems therefor. As a specific example, the fractionator-column requires (among other things): a pressure-reducing valve in the line conveying liquid absorbent from the absorber to the fractionator; a system for heating the flow in that line to a selected temperature; a flash chamber in that line; a differential-pressure indicator for the liquid in the column; a pressure-reducing valve in the off-gas line to control column pressure; a condenser-containing system for venting desorbed gases; a refrigeration system for the condenser; a solvent reboiler; and reboiler-heater and level-control systems. Another disadvantage of the conventional system is that a high-pressure-ratio pump is required for recycling the liquid solvent from the stripper to the absorber. Another disadvantage is that the pressure-reducing valve between the absorber and fractionator tends to plug with ice if there is appreciable water vapor in the feed gas to the absorber. The disadvantages of the conventional gas-absorption systems are of special concern in applications where the feed gas contains radioactive components, because in that event process reliability is of paramount importance and the entire system must be housed in a "hot cell," where space is at a premium and in which repair or replacement of system components is difficult.

OBJECTS OF THE INVENTION

It is, therefore, an object of this invention to provide a novel gas-absorption process.

It is another object to provide a gas-absorption process in which a liquid absorbent for a selected gaseous component is passed successively through an absorption zone, an intermediate contacting zone, and a stripping zone, the selected component being concentrated as a gas at a selected withdrawal point in the intermediate zone.

It is another object to provide a gas-absorption process which can be conducted in a comparatively simple system characterized by improved reliability.

It is another object to provide a gas-absorption process in which a liquid absorbent is passed successively through an absorption zone, an intermediate contacting zone, and a stripping zone, the operating pressures in the three zones being approximately equal and the operating temperatures of the absorption zone and the inlet portion of the intermediate zone being substantially the same.

Other objects will be made evident hereinafter.

SUMMARY OF THE INVENTION

Our invention may be summarized as follows: In a process wherein a liquid phase is withdrawn from a first liquid-gas contacting zone and passed downwardly through second and third liquid-gas contacting zones, the liquid-phase input to the second zone comprising a liquid absorbent containing in solution a selected gaseous component and at least one less-soluble, diluent gas, said liquid-phase input being contacted in the second zone with a warmer, upflowing gas phase derived from the third zone, said gas phase comprising vapor of said liquid absorbent and a lesser amount of gas desorbed from said liquid absorbent; the method of recovery said component as a gas, comprising:

(a) establishing a peak concentration of said component in a section of the second zone by
 (1) maintaining the temperature of the liquid-phase input to the second zone at a sufficiently lower value than the temperature of the gas-phase input to the second zone to effect, in said section, condensation of a major fraction of the absorbent-vapor upflow into said section; and
 (2) maintaining below said section stripping factors of less than one for said component and for gases less soluble than said component while maintaining above said section stripping factors of more than one for said component and less than one for less-soluble gases; and (b) withdrawing gas rich in said component from said section.

DESCRIPTION OF THE PREFERRED EMBODIMENT

Figure 1:
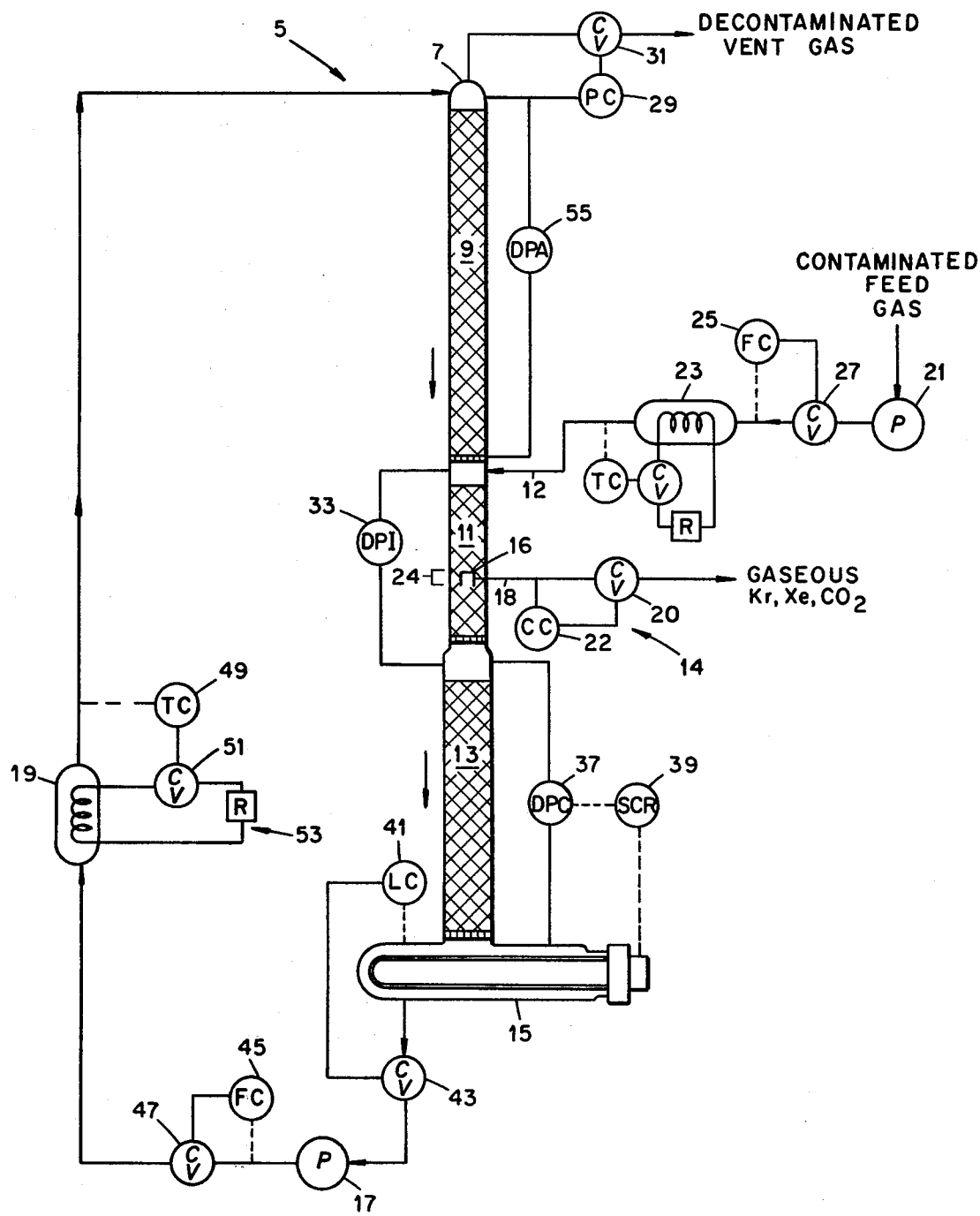
FIG. 1 is a schematic diagram of a system for carrying out the process of this invention.

This process is generally applicable to gas-absorption processes for the removal of selected components from feed-gas mixtures. The process employs a novel technique for concentrating a selected component of the feed-gas mixture in a selected part of a contacting zone usually referred to in conventional processes as the fractionating zone or the intermediate stripping zone. The new concentration technique may be used in previous absorption systems utilizing two or more separate liquid-gas columns, but its chief advantage is that it permits the process operations to be effected in a single liquid-gas contactor having successive contacting zones which operate at virtually the same pressure.

Our process is based in part on a discovery made in the course of a krypton-recovery run conducted in a three-column gas-absorption system of the kind disclosed in the above-referenced patent. The liquid absorbent, or solvent, used in this run was dichlorodifluoromethane ($CCl_2F_2$), and the feed gas consisted essentially of nitrogen, oxygen, carbon dioxide ($^{14}CO_2$), and trace amounts of radioactive krypton-85 (0.1 ppm) and xenon. The design values for the column temperatures and pressures were as follows: absorber, 300 psig and $-25°$ F.; fractionator, 35 psig and 37.5° F.: stripper, 10 psig and 1° F. All of the columns contained wire-mesh packing. As is customary, the line conveying liquid solvent from the absorber to the fractionator contained a flash chamber, and an electric heater was provided for heating the liquid input to the flash chamber to approximately 33° F.

In the course of the aforementioned run, the heater in the line to the flash chamber burned out. Operations were continued without the heater, however, with the result that the liquid input to the top of the fractionator was at an appreciably lower temperature ($-25°$ F.) than usual. Unexpectedly, this mode of operation caused krypton to concentrate as a gas in a narrow section, or band, of the packed portion of the fractionator column. That is, unexpectedly, krypton concentrated in this section to the extent that the krypton-concentration profile for the fractionator peaked in the section. (This effect was in marked contrast to previous operations of the fractionator; in those operations, a larger percentage of the krypton was present in the desorbed gases vented from the top of the fractionator, with the remainder being conveyed to the stripper column by the liquid absorbent, without krypton buildup in the fractionator column.) The section in which the krypton concentrated was spaced about 6 inches from the bottom of the packed portion of the column and extended upward for about 36 inches. Subsequent investigation established that in this same section much of the hot (37° F.) absorbent-vapor upflow from the fractionator reboiler was being condensed by heat exchange with the cold ($-25°$ F.) liquid downflow from the top of the fractionator, thus establishing a steep temperature gradient across the section. That is, the temperature of the liquid phase was sufficiently below that of the gas phase to effect bulk condensation of the upflowing absorbent vapor.

It was found that the vapor condensation resulting from heat exchange between the counterflowing liquid and gas phases could be made to take place anywhere along the length of the fractionator by adjusting the relative temperatures and/or flow rates of the two phases. The position of the vapor-condensation zone was most sensitive to changes in the solvent flow rate. For instance, with a constant column loading (i.e., constant $\Delta P$), the vapor-condensation effect could be moved one to two feet downward or upward merely by respectively increasing or decreasing the liquid flow rate through the column by 10%. Again, if the boilup rate was increased, the vapor-condensation effect could be maintained in the same section of the column by increasing the liquid flow by a selected amount. When conditions were altered to move the vapor-condensation effect to a different section of the column, the peak concentration of krypton moved to that section.

Experiments conducted in the above-described three-column system established that high krypton-concentration factors could be achieved by (a) maintaining in the part of the column below the krypton-concentration section, stripping factors of less than one for krypton and gases less soluble than krypton, and (b) maintaining in the part of the fractionator above that section, stripping factors of more than one for krypton and less than one for the less soluble gases. [The term "stripping factor" refers to L/kG, where L and G are respectively the molar flow rates of the downflowing liquid and upflowing gas (absorbent vapor and desorbed gases), and k is the equilibrium distribution coefficient for a particular component satisfying the relationship $y=kx$, where y is the mole fraction of the component in the gas phase and x is the mole fraction of the same in the liquid phase.] That is, high krypton-concentration factors could be achieved if there were enough stripping stages below the vapor-condensation section to strip virtually all of the dissolved gases from the liquid absorbent, and enough contact stages above the section to effect re-dissolution of the krypton but not the less-soluble nitrogen and oxygen. With the fractionator operating under such conditions, the vapor-condensation section was utilized as a krypton-take off section. Standard gas-withdrawal equipment was employed to remove gas rich in krypton from this section, the concentration of krypton in the withdrawn gas being dependent in part on the withdrawal rate.

On the basis of the above-discussed findings, we have designed an improved gas absorption process, which preferably is conducted in a closed-loop system utilizing a single gas-liquid contacting column. As used herein, the term "column" includes any vertically disposed gas-liquid contactor.

EXAMPLE I

FIG. 1 illustrates such a system as designed for the separation of fission-product krypton-85 from the waste gas from a nuclear fuel element reprocessing plant. The composition of the feed-gas input to the system is shown in Table I, which also presents an illustrative set of design parameters for the gas-absorption process.

Referring to FIG. 1 and Table I, the system 5 is designed for a feed-gas flow rate of 0.58 lb-mole/hr. As shown, the system includes a closed loop through which any suitable liquid solvent for krypton — say, dichlorodifluoromethane ($CCl_2F_2$) — is circulated continuously in the direction shown. The loop includes a vertical column 7 having three separate packed zones designated as upperabsorption zone 9, intermediate contacting zone 11, and lower stripping zone 13. (As used herein, the term "intermediate zone" includes the entire region extending from the top of the stripping zone to a feed-gas inlet 12). The various zones contain wire-mesh-type packings commonly used in industrial columns. As shown in FIG. 1, a system 14 is provided for intermittently or continuously withdrawing gas from the aforementioned Kr-takeoff section 24 of the intermediate zone 11. The location of this section in the zone 11 can be pre-determined by routine techniques, as by making test runs and taking gas samples or making radiation measurements along zone 11. The withdrawal system 14 includes any suitable means for intercepting and retaining upflowing gas in section 24, such as an inverted cuplike gas collector 16 whose interior is vented to a gas-withdrawal line 18. The line 18 includes an automatic flow-control valve 20, which is opened when the krypton concentration in the line reaches a selected value actuating a radiation-responsive controller 22 for the valve. A gas-withdrawal system of this kind is disclosed in U.S. Pat. No. 3,887,339, issued on June 3, 1975. If desired, minor adjustments may be made in the process variables to optimize the position of the concentration peak with respect to the gas collector 16.

As shown, the lower end of the column 7 is connected to a standard electrically heated reboiler 15 for receiving liquid solvent outflow from the stripping zone and converting part of the solvent to vapor which flows upwardly through the stripper. The stripping zone is designed with a larger diameter than zones 9 and 11 to accomodate its relatively high solvent boilup rate. As shown in FIG. 1, any suitable pump 17, such as a standard centrifugal pump or turbine, is provided to recycle hot, regenerated liquid solvent from the bottom of the reboiler to the upper end of the column 7. As indicated in the table, the three zones in the column operate at approximately the same superatmospheric pressure (7.78 atmospheres); thus, the pump 17 need overcome only the gravity head of the column. A chiller 19 is provided in the outlet line of pump 17 to cool the recycled solvent to $-25°$ F., the design temperature for the absorption zone.

As shown in FIG. 1, the feed gas to be introduced to the column is fed to a compressor for pressurizing the gas to the operating pressure of the column: Following compression, the feed gas is chilled to absorption-zone temperature by passage through a cooler 23. The chilled feed gas is introduced to the column through inlet 12 to a point just below the absorption zone 9 and flows upwardly through this zone so as to countercurrently contact the recycled liquid solvent. Approximately 95% of the krypton in the feed gas dissolves in the solvent and is carried into the intermediate zone 11. The undissolved krypton and most of the less-soluble feed-gas constituents (e.g., nitrogen and oxygen) are vented from the top of the column for disposal.

As described, the cold, downflowing solvent entering zone 11 effects condensation of a major fraction of the warm, upflowing solvent vapor from the stripping zone 13. With the particular conditions of operation cited in Table I, this condensation takes place in a relatively narrow section 24 of zone 11, whose position relative to the bottom of the packed section is given in the table.

As previously described, it is in this section that krypton concentrates (along with all of the more-soluble xenon and carbon dioxide, if contained in the downflowing liquid solvent and if sufficient stripping vapor flow is maintained.)

Figure 2:
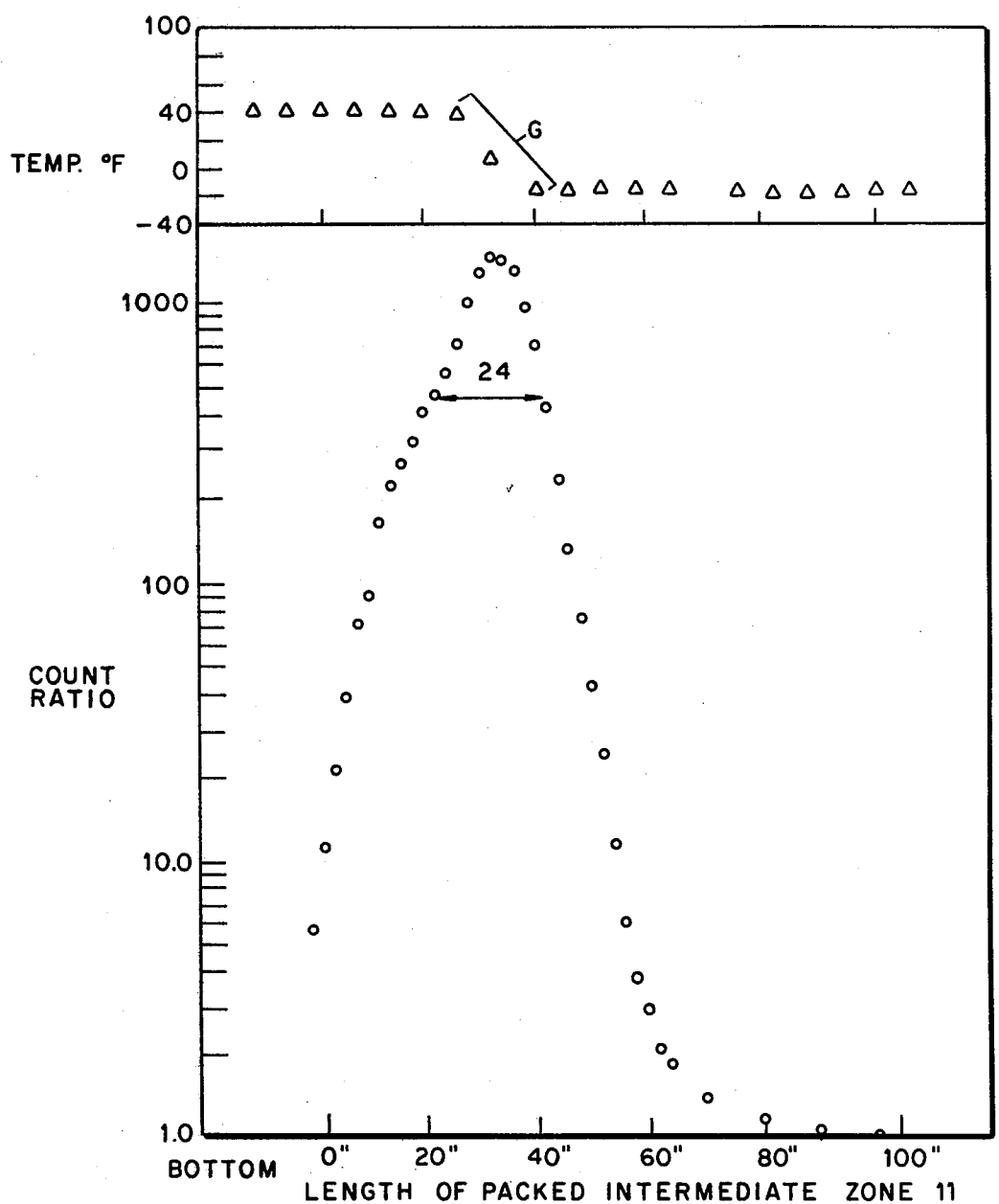
FIG. 2 is a graph showing the temperature profile and krypton-concentration profile for an intermediate contacting section 11 of a three-zone packed column 7 shown in FIG. 1.

FIG. 2 shows how the krypton concentration typically peaks in the region of the steep temperature gradient G resulting from the above-described condensation of solvent vapor. In FIG. 2, "Count Ratio" refers to the ratio of the gamma count-rate of Kr-85 at the position indicated to that of the liquid-inlet end of zone 11 (100 inches above the bottom of the zone). These measurements were made with conventional instrumentation—i.e., an external scanning gamma scintillation detector and with gamma-ray spectroscopy equipment. Each of the krypton-concentration points shown represents the total amount of krypton at that point. In all parts of zone 11, including aforementioned section 24, part of the krypton is in solution and part is out of solution. As mentioned above, we have found that the krypton and any other soluble gas present can be withdrawn from this section as a concentrated gaseous product by means of standard gas-sampling equipment, such as the system 14 (FIG. 1). Also as mentioned, we have found that the peak concentration of krypton always occurs in the region 24 (FIGS. 1 and 2) where we induce localized vapor-condensation in the manner described, permitting the withdrawal of krypton-rich gas from the section.

As shown in Table 1, the stripping factors in the portion of zone 11 above section 24 are maintained at values effecting re-dissolution of gaseous krypton moving upward from section 24 but not effecting re-dissolution of the less-soluble desorbed gases (nitrogen, oxygen) from the stripping zone. The stripping factors below section 24 — i.e., in the lower part of zone 11 and in zone 13 — ensure that virtually all of the gas dissolved in the liquid downflow to the stripper in desorbed. The resulting regenerated liquid solvent is recycled from the reboiler to the absorption zone by the pump 17, as described.

As shown in FIG. 1, the system 7 includes various standard control systems. These comprise flow-control means 25 for monitoring feed-gas flow and operating a control valve 27 to maintain the flow at a selected value; pressure-control means 29 for sensing the gas pressure at the top of the column and operating a control valve 31 to regulate the gas-withdrawal rate from the top of the column; differential-pressure-indicator means 33 across the intermediate section 11; differential-pressure-control means 37 for sensing the pressure differential across the stripping zone and operating heater-control means 39 (e.g., a silicon-controlled rectifier) to regulate the electrical input to the heater for reboiler 15; level-control means 41 for sensing the liquid level in the reboiler and operating a control valve 43 to maintain a selected level of liquid solvent in the reboiler; flow-control means 45 for sensing the flow rate from the pump 17 and operating a control valve 47 to regulate the same; and means 49 for sensing the temperature of the outflow from the solvent-chiller 19 and operating a valve 51 in a refrigeration loop 53 to maintain the temperature of the outflow at a selected value; and a product-withdrawal system 14, previously described. A pressure-differential alarm 55 is provided across the absorption section 9.

Table I shows the composition of the product gas obtained by operating the system 7 as described. As indicated in the table, krypton-concentration factors of about 2000-5000 are obtained. The product gas is withdrawn intermittently, whenever the krypton concentration exceeds a selected value as determined by the aforementioned radiation-responsive controller 22. It will be noted that the intermediate zone 11 of the column operates at a considerably higher L/G ratio than the other zones. This is due in part to the condensation in section 24 of a major fraction of the absorbent-vapor upflow from the stripping zone.

An important feature of our process is to maintain sufficient difference in the temperatures and flow rates of the liquid and gas inputs to the intermediate zone to effect localized condensation of a major fraction of the absorbent-vapor upflow therein. The operating conditions should be such that the heat flows up and down the column are in balance as shown in Table II of Example I. In designing our process for a particular application it is helpful first to calculate the solvent flow required to dissolve the necessary fraction of soluble component in the particular process off-gas, and then size the absorber diameter and height accordingly. We then calculate the minimum amount of vapor-stripping required to sufficiently remove the dissolved component from the solvent. Next, a calculation is made of the amount of vapor that the downflowing liquid can condense as it is heated from the absorber temperature to the reboiler temperature. If the amount of vapor that can be condensed is greater than the minimum, the greater of the two values is used and the design is fixed. If the calculated value is less than the minimum, then other parameters such as the system pressure and absorber temperature are adjusted. Alternatively, an in-line vapor-condenser (designated as 57 in FIG. 3 and discussed subsequently) may be utilized to extract the extra heat. This gives the process an extra degree of freedom. Once the end points of the column are fixed, the intermediate zone L/V ratio and consequently, intermediate zone stripping factors can be calculated for each component. If these factors are greater than 1 for the more soluble components and less than 1 for the less soluble components, then the process conditions are sufficient to establish the desired internal column concentration of soluble gas components. If not, process parameters are changed or an alternate solvent selected.

It will be understood that the design parameters listed in Table I are not necessarily the optimum values. Table I is based on a feed-gas flow rate of 0.58 lb-mole/hr. If this flow rate were, say, 0.43 lb-mole/hr., this would result in an absorption-zone L/G mole ratio of 15, which in turn would result in an overall krypton removal of approximately 99%. In some instances, the krypton-containing feed gas to system 7 may contain iodine or methyl iodide as contaminants. These will remain dissolved in the liquid solvent entering the reboiler. To prevent appreciable buildup of these contaminants in the solvent, a part of the reboiler bottoms may be withdrawn, separated from the iodine and methyl iodide, and then recycled to the pump 17. The separation may be accomplished by various conventional techniques, such as the distillation operation described in column 17 of the above-referenced patent.

It will be apparent that our process provides important advantages as compared with previous gas-absorption processes. Because the process can be conducted in a single column whose various zones operate at virtually the same pressure, the process system as a whole is significantly smaller and simpler. For example, compared with the conventional three-column process described above under "Background of the Invention," our process eliminates the following fractionator-column auxiliaries: (1) the absorber liquid-level system; (2) the system for heating the liquid-solvent outflow from the absorber column; (3) the flash chamber in the solvent-feed line to the fractionator; (4) the pressure-reducing valve between the absorber and fractionator; (5) the liquid-level indicator for the fractionator; (6) the condenser-containing system for venting desorbed gas from the fractionator; (7) the fractionator pressure-control and gas-recycle circuit; (8) the reboiler for the fractionator; (9) the heater control system for the fractionator reboiler; (10) the condenser-containing system for venting desorbed gas from the stripper. It will be apparent that elimination of these components not only reduces capital costs but also promotes system reliability significantly. Another advantage of this process is that the recycle pump requirements are reduced appreciably. Another advantage is that elimination of the above-mentioned absorber-to-fractionator pressure-reducing valve makes it possible to operate satisfactorily with higher concentrations of water vapor in the feed gas.

We do not wish to be bound by any theory regarding the mechanism causing the selected component (e.g., gaseous krypton) to concentrate in a narrow section of the intermediate zone 11 in our process. Presumably, this concentration is a result of the repeated desorption and absorption of that component taking place in the regions below and above the section.

This process has been illustrated in terms of the recovery of krypton from a particular feed gas by contacting the latter with liquid $CCl_2F_2$ to preferentially absorb krypton, but it will be apparent to those versed in the art that the process is generally applicable to the absorption of gaseous components. In general, where a particular liquid solvent has been used to recover a particular component from a feed gas by means of the usual multicolumn process, the same solvent can be used to recover that component in accordance with the present process. For example, this process can be conducted with any liquid-flourocarbon or liquid-hydrocarbon absorbents having sufficient selectivity, capacity, and stability for the recovery of a particular component from feed-gas mixtures. (Above-referenced U.S. Pat. No. 3,762,133 discusses the usefulness of liquid fluorocarbons in general as absorbents.) Liquid water also may be used. Referring to the krypton-recovery process described in Example I, above, good recovery could be obtained with numerous liquid absorbents other than $CCl_2F_2$ — as, for example, $CCl_3F$; $C_2Cl_2F_4$; $CCl_4$; $N_2O$; and kerosene. The following are a few examples of the wide variety of components which can be removed from feed-gas mixtures in accordance with this process: Kr, Xe, $H_2S$, COS, $N_2$, $CH_4$, $O_2$, Ar, Rn and the lower oxides of carbon, nitrogen, and sulfur (i.e., oxides having one or two oxygen atoms). It will be apparent to those skilled in the art that determining the suitability of a particular absorbent for the recovery of a selected component would require only routine testing. Depending on the particular application, the operating pressure in our process may vary from approximately one to 100 atmospheres. The absorption-zone temperature preferably is in the range of from −200° F. to 500° F. We have found that in some applications, at least, the feed gas need not be chilled prior to introduction to the absorption zone, since the effect of introducing warm feed gas is merely to shorten the effective length of the absorption by a relatively small amount.

TABLE I

(Absorbent: $CCl_2F_2$)

| | Absorption Zone 9 | Intermediate Zone 11 | Stripper Zone 13 |
|---|---|---|---|
| Operating Pressure, atm | 7.78 | 7.78 | 7.78 |
| Operating Temperature, °F | −25 | −25 (top) 90 (bottom) | 90 |
| L/G Mole Ratio | 10 | 40 | 3.2 |
| Column Diameter, inches | 3 | 3 | 6 |
| Column Packing | wire mesh | wire mesh | wire mesh |
| Column Packed Height, feet | 12 | 6 | 6 |
| Solvent Boilup, lb-mole/hr | — | — | 4.1 |
| Feed Gas, composition, 96.5% $N_2$; 2.9% $O_2$; 0.3% Ar; 0.3% $CO_2$; mole percent: 0.1 ppm Kr | | | |
| Feed Gas, Flow Rate, lb-mole/hr | 0.58 | | |
| Solvent Flow Rate, lb-mole/hr. | 9.1 | | |
| Overall Krypton Removal, percent | 95 | | |
| Krypton Concentration Factor | 2,000–5,000 | | |
| Product Gas Composition, 5.0% $N_2$; 7.6% $O_2$; 1.4% Ar; 42.3% $CO_2$; mole percent: 43.7% $CCl_2F_2$; 270 ppm Kr | | | |
| Product Gas Composition mole percent, on solvent-free-basis*: 8.88% N2; 13.5% $O_2$; 2.48% Ar; 75.1% $CO_2$; 480 ppm Kr | | | |
| Stripping Factor for Kr above Kr-Takeoff Section: | 2.7 | | |
| Stripping Factor for $N_2$ above Kr-Takeoff: | 0.66 | | |
| Stripping Factor for Kr below Kr-Takeoff Section: | 0.13 | | |
| Stripping Factor for $N_2$ below Kr-Takeoff: | 0.06 | | |
| Position of Kr-Takeoff in Zone 11; 6 inches above bottom of packing | | | |

*Solvent removed as by passing the product gas through a suitable molecular sieve (e.g., Type 13x), manufactured by Davision Chemical Company; Linde Division, Union Carbide) or activated charcoal.

TABLE II

Heat Balance Based on $CCl_2F_2$ Entering and Leaving Zone 11

| | |
|---|---|
| Heat Content, Liquid-Phase Input to Zone 11 (−25° F, 9.1 lb-mole/hr): | −3,400 Btu/hr |
| Heat Content, Liquid-Phase Leaving Zone 11 (90° F, 13.1 lb-mole/hr): | 45,300 Btu/hr |
| Heat Content Change, Liquid Phase (4.0 lb-mole/hr: | 41,900 Btu/hr |
| Heat Content, Vapor-Phase Input to Zone 11 (90° F, 4.1 lb-mole/hr): | −42,400 Btu/hr |
| Heat Content, Vapor-Phase Leaving Zone 11 (32° F, 0.1 lb-mole/hr): | 500 Btu/hr |
| Heat Content Change, Vapor Phase (−4.0 lb-mole/hr): | −41,900 Btu/hr |

EXAMPLE II

The following is another example of our process as applied to recovering gaseous $H_2S$, COS, and $CS_2$ is concentrated form from the combustible gases generated from coal by various gasification techniques. In this application, the absorption system can be similar to that illustrated in FIG. 1. The liquid absorbent for the sulfur components to be recovered in refrigerant-114 ($C_2Cl_2F_4$). Tables III and IV list the design parameters and conditions for the process. The $H_2S$ and COS are withdrawn in concentrated gaseous form from a takeoff section 24 of zone 11, as described in connection with Example I. [It will be noted that in this case, (e.g., at 1 atm pressure, $CS_2$ boils at 115° F. while R-114 boils at 38.4° F.) the $CS_2$ is less volatile than the solvent and consequently $CS_2$ remains in the solvent during the stripping operation. This component can be effectively removed from the recirculating solvent by means of a distillation operation, such as is described in column 17 of the above-referenced patent.] Various other liquid absorbents may be used in this particular application of the process for sulfur removal from fuel gases — e.g., refrigerant-113 ($C_2Cl_3F_3$) and refrigerant-11 ($CCl_3F$).

As previously mentioned, this process is generally useful for gas-absorption applications. For instance, the process may be used to remove carbon dioxide from air before the latter is introduced to a cryogenic plant for the production of argon, oxygen, and nitrogen by liquefaction-distillation. Again, the process is applicable to the recovery of helium from gas mixtures. It may, for example, be used to recover purified helium from a feed gas consisting of natural gas and nitrogen. The feed gas is introduced to the absorption zone of a column of the kind illustrated in FIG. 1 and utilizing, say, liquid $CCl_3F$ as the absorbent. Unlike Examples I and II, the process conditions can be selected such that essentially all of the methane and nitrogen dissolve in the downflowing absorbent and are withdrawn as described, whereas virtually pure gaseous helium is withdrawn from the top of the column. Helium and hydrogen are the least soluble of all the components worked with thus far.

Figure 3:
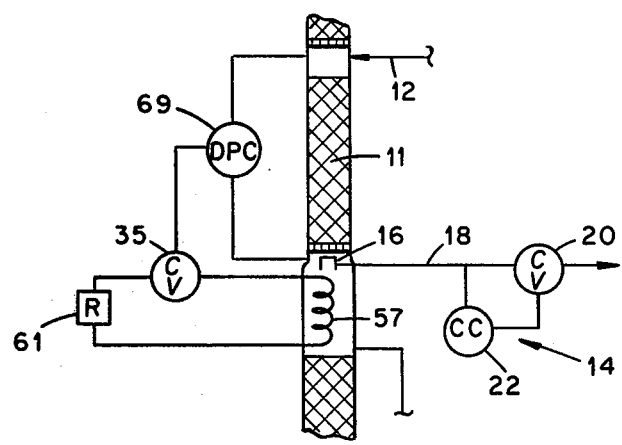
FIG. 3 is a detail view of part of the column 7 as modified to carry out a modified form of the invention.

Referring to FIG. 3, some gas-absorption applications may call for such a high vapor-boilup rate in the stripper that the heat content of the upflowing solvent vapor considerably exceeds the heat content of the downflowing liquid solvent. Such a situation may arise where it is desired to keep the concentrations of highly soluble gases (e.g., xenon or carbon dioxide) as low as possible in the regenerated solvent. To maintain a heat balance throughout the column, a condenser 57 may be mounted within the column between the section 24 and the stripping zone to condense a selected part of the upflowing solvent vapor. As shown, the condenser 57 may be part of a loop containing a standard external refrigeration supply 61 and refrigerant flow-control valve 35, the latter being positioned by a controller 69 connected to sense the differential pressure across zone 11. By condensing a selected fraction of the vapor upflow, the loop 61 removes sufficient heat to maintain the pressure differential across zone 11 at a value correspondening to an exact heat balance across the column. If desired, the refrigeration load of the condenser may be adjusted to trim the position of aforementioned section 24, so as to make minor adjustments in the position of the krypton-concentration peak with respect to the product-gas collector 16.

TABLE III

Absorbent: R-114 ($C_2Cl_2F_4$)

| | Absorption Zone 9 | Intermediate Zone 11 | Stripper Zone 13 |
|---|---|---|---|
| Operating Pressure, atm | 11.2 | 11.2 | 11.2 |
| Operating Temperature, °F | 100 | 100/193 | 193 |
| L/G Mole Ratio | 3.47 | 15.5 | 2.71 |
| Column Diameter, inches | 10 | 10 | 16 |
| Column Packing | wire mesh | wire mesh | wire mesh |
| Column Packed Height, feet | 15 | 6 | 10 |
| Solvent Boilup, lb-mole/hr | — | — | 44.8 |
| Feed Gas, Composition, mole %: 80.0% $CH_4$; 10.0% $H_2$; 9.9% CO; 500 ppm $H_2S$; 250 ppm COS; 250 ppm $CS_2$ | | | |
| Feed Gas Flow Rate, lb mole/hr 15.6 | | | |
| Solvent Flow Rate, lb-mole/hr 78.0 | | | |
| Overall Sulfur Removal, percent >99 | | | |
| Sulfur Concentration Factor: 200–1000 | | | |
| Product Gas Composition: 10.6% $H_2S$; 5.30% COS 0.012% $CS_2$; 3.33% $CH_4$; 0.07% CO; 0.04% $H_2$; 80.7% R-114 | | | |
| Product Gas Composition, Solvent-Free Basis: 54.8% $H_2S$; 27.4% COS; 0.062% $CS_2$; 17.2% $CH_4$; 0.37% CO; 0.22% $H_2$ | | | |
| Stripping Factors for $H_2S$, COS, $CS_2$ above Sulfur-Takeoff Section: | 3.76; 5.94; 103 | | |
| Stripping Factors for $CH_4$, CO, $H_2$ above Sulfur-Takeoff Section: | 0.901, 0.525; 0.0912 | | |
| Stripping Factors for $H_2S$, COS, $CS_2$ below Sulfur-Takeoff Section: | 0.402; 0.644; 8.87* | | |
| Stripping Factors for $CH_4$, CO, $H_2$ below Sulfur-Takeoff Section: | 0.138; 0.0925; 0.0160 | | |

TABLE III-continued

Absorbent: R-114 ($C_2Cl_2F_4$)

|  | Absorption Zone 9 | Intermediate Zone 11 | Stripper Zone 13 |
|---|---|---|---|
| Position of Sulfur-Takeoff Section in Zone 11: | | 12 inches above bottom of packing | |

*$CS_2$ does not strip from the solvent

TABLE IV

| Heat Balance Based on $C_2Cl_2F_4$ Entering and Leaving Zone 11 | |
|---|---|
| Heat Content, Liquid-Phase Input to Zone 11 (100° F, 78.0 lb-mole/hr): | −5,000 Btu/min |
| Heat Content, Liquid-Phase Leaving Zone 11 (190° F, 121 lb-mole/hr): | 13,500 Btu/min |
| Heat Content Change, Liquid Phase (+43.2 lb-mole/hr): | +8,500 Btu/min |
| Heat Content, Vapor-Phase Input to Zone 11 (193° F, 44.8 lb-mole/hr): | −8,800 Btu/min |
| Heat Content, Vapor-Phase Leaving Zone 11 (110° F, 1.6 lb-mole/hr): | 300 Btu/min |
| Heat Content Change, Vapor Phase (−43.2 lb-mole/hr): | −8,500 Btu/min |

What is claimed is:

1. In a process wherein a liquid phase is withdrawn from a first liquid-gas contacting zone for effecting preferential absorption of a selected component of a feed-gas mixture in a liquid absorbent and is passed downwardly through second and third liquid-gas contacting zones, the liquid-phase input to the second zone comprising said liquid containing absorbent in solution said gaseous component and at least one less-soluble, diluent gas, said liquid-phase input being contacted in the second zone with a warmer, upflowing gas phase derived from the third zone, said gas phase comprising vapor of said liquid absorbent and a lesser amount of gas desorbed from said liquid absorbent; the method of recovering said component as a gas, comprising:
    (a) establishing a peak concentration of said component in a section of the second zone by
        (1) maintaining the temperature of the liquid-phase input to the second zone at a sufficiently lower value than the temperature of said upflowing third-zone-derived gas-phase input to the second zone to effect, in said section, condensation of a major fraction of the absorbent-vapor upflow into said section; and
        (2) maintaining below said section stripping factors of less than one for said component and for gases less soluble than said component while maintaining above said section stripping factors of more than one for said component and less than one for less-soluble gases; and
    (b) withdrawing gas rich in said component from said section.

2. The process of claim 1 wherein said liquid-phase input to the second zone is at a temperature in the range of from approximately −200° F. to 500° F.

3. The process of claim 1 wherein the first, second, and third zones, respectively comprise upper, intermediate, and lower zones of a single liquid-gas contacting column.

4. The process of claim 3 wherein the upper, intermediate, and lower zones of said column are maintained at approximately the same superatmospheric pressure.

5. The process of claim 1 wherein said liquid absorbent is selected from the group consisting of fluorocarbons, hydrocarbons, and water.

6. A process for recovering a selected component from a feed-gas mixture containing the same, said process comprising:
    (a) providing a liquid-gas contacting column defining an upper zone, an intermediate zone, and a lower zone;
    (b) passing a stream of a liquid absorbent for said component downwardly through the zones of said column, said zones being maintained at approximately the same superatmospheric pressure and at least part of said lower zone being maintained at the boiling point for said absorbent at the pressure prevailing in said column;
    (c) in said upper zone, countercurrently contacting said liquid absorbent with said feed gas mixture;
    (d) in said intermediate zone, countercurrently contacting the resulting gas-enriched liquid absorbent with desorbed gases and absorbent vapor derived from said lower zone;
    (e) in said lower zone, countercurrently contacting the liquid absorbent from the intermediate zone with absorbent vapor and desorbed gases obtained by boiling the liquid absorbent downflow through said lower zone;
    (f) maintaining the temperatures and flow rates of the countercurrent liquid- and gas-phase inputs to said intermediate zone at values effecting, in a section of said intermediate zone, condensation of a major fraction of the absorbent-vapor upflow into said section, while maintaining below said section stripping factors of less than one for said components and for gases less suitable than said component and above said section stripping factors of more than one for said component and less than one for gases less soluble than said component, thus concentrating said component as in said section, and
    (g) withdrawing gas enriched in said component from said section.

7. The process of claim 6 wherein said liquid absorbent is selected from the group consisting of fluorocarbons, hydrocarbons, and water.

8. The process of claim 6 wherein said upper zone of said column is maintained at a temperature in the range of from approximately −200° F. to 500° F.

9. The process of claim 6 wherein heat is removed from a region of said column disposed between said lower zone and said section by condensing a part of the absorbent-vapor upflow in said region and transferring the heat of condensation to a heat sink outside said column.

10. The process of claim 6 wherein the gas withdrawn from said section is derived from an inverted cuplike gas-collector mounted in said section.

* * * * *